(12) United States Patent
Johnston

(10) Patent No.: US 8,929,688 B2
(45) Date of Patent: Jan. 6, 2015

(54) REMAPPING METHODS TO REDUCE DISTORTIONS IN IMAGES

(75) Inventor: Richard S. Johnston, Sammamish, WA (US)

(73) Assignee: University of Washington, Seattle, WA (US)

( * ) Notice: Subject to any disclaimer, the term of this patent is extended or adjusted under 35 U.S.C. 154(b) by 3004 days.

(21) Appl. No.: 10/956,241

(22) Filed: Oct. 1, 2004

(65) Prior Publication Data

US 2006/0072843 A1    Apr. 6, 2006

(51) Int. Cl.
| | |
|---|---|
| G06K 9/26 | (2006.01) |
| G06K 9/40 | (2006.01) |
| H04N 1/107 | (2006.01) |
| G06K 9/20 | (2006.01) |
| G06K 9/30 | (2006.01) |

(52) U.S. Cl.
CPC ............... G06K 9/20 (2013.01); H04N 1/107 (2013.01); G06K 9/30 (2013.01); G06K 9/209 (2013.01)
USPC .......................... 382/322; 382/254; 358/484

(58) Field of Classification Search
USPC .................................. 382/322, 254; 358/484
See application file for complete search history.

(56) References Cited

U.S. PATENT DOCUMENTS

| | | | |
|---|---|---|---|
| 4,527,893 A | 7/1985 | Taylor | |
| 4,677,683 A | 6/1987 | Pferd et al. | |
| 4,767,911 A | 8/1988 | Maram | |
| 4,919,508 A | 4/1990 | Grace et al. | |
| 4,972,344 A | 11/1990 | Stoddard | |
| 4,991,971 A | 2/1991 | Geary et al. | |
| 5,011,259 A | 4/1991 | Lieber et al. | |
| 5,172,685 A | 12/1992 | Nudelman | |
| 5,317,148 A | 5/1994 | Gray et al. | |
| 5,400,267 A | 3/1995 | Denen et al. | |
| 5,625,451 A | 4/1997 | Schiff et al. | |
| 5,681,307 A | 10/1997 | McMahan | |
| 5,693,042 A | 12/1997 | Boiarski et al. | |
| 5,727,098 A | 3/1998 | Jacobson | |
| 5,742,718 A | 4/1998 | Harman et al. | |
| 5,764,874 A | 6/1998 | White | |
| 5,768,461 A | 6/1998 | Svetkoff et al. | |
| 5,822,486 A | 10/1998 | Svetkoff et al. | |
| 5,870,511 A | 2/1999 | Sawatari et al. | |
| 5,894,322 A * | 4/1999 | Hamano et al. | 348/68 |
| 5,907,425 A | 5/1999 | Dickensheets et al. | |
| 5,933,240 A | 8/1999 | Jurca | |
| 6,046,720 A | 4/2000 | Melville et al. | |

(Continued)

FOREIGN PATENT DOCUMENTS

WO    WO 00/75712    12/2000

OTHER PUBLICATIONS

Smithwick et al., "Control Aspects of the Single Fiber Scanning Endoscope." 2001, SPIE, pp. 176-188.*

(Continued)

*Primary Examiner* — John Strege
(74) *Attorney, Agent, or Firm* — Wilson Sonsini Goodrich & Rosati

(57) ABSTRACT

The present invention provides software, methods, and systems for characterizing an actual scan pattern of a scanning beam device. The characterization of the actual scan pattern may be used in an image remapping method and/or a drive signal remapping method to reduce distortions in an image.

14 Claims, 11 Drawing Sheets

(56) References Cited

U.S. PATENT DOCUMENTS

| | | | |
|---|---|---|---|
| 6,091,067 | A | 7/2000 | Drobot et al. |
| 6,211,904 | B1 | 4/2001 | Adair et al. |
| 6,222,628 | B1 | 4/2001 | Corallo et al. |
| 6,294,775 | B1 | 9/2001 | Seibel et al. |
| 6,327,493 | B1 | 12/2001 | Ozawa et al. |
| 6,329,778 | B1 | 12/2001 | Culp et al. |
| 6,388,641 | B2 | 5/2002 | Tidwell et al. |
| 6,402,743 | B1 | 6/2002 | Orszulak et al. |
| 6,411,838 | B1 | 6/2002 | Nordstrom et al. |
| 6,492,962 | B2 | 12/2002 | Melville et al. |
| 6,498,948 | B1 | 12/2002 | Ozawa et al. |
| 6,563,105 | B2 * | 5/2003 | Seibel et al. ............... 250/208.1 |
| 6,564,087 | B1 | 5/2003 | Pitris et al. |
| 6,626,834 | B2 | 9/2003 | Dunne |
| 6,627,903 | B1 | 9/2003 | Hirayanagi |
| 6,666,860 | B1 | 12/2003 | Takahashi |
| 6,845,190 | B1 * | 1/2005 | Smithwick et al. ............. 385/25 |
| 2001/0030744 | A1 | 10/2001 | Chang |
| 2001/0055462 | A1 | 12/2001 | Seibel |
| 2002/0024709 | A1 * | 2/2002 | Tsai .............................. 359/210 |
| 2002/0064341 | A1 | 5/2002 | Fauver et al. |
| 2002/0077544 | A1 * | 6/2002 | Shahidi ......................... 600/424 |
| 2002/0131052 | A1 | 9/2002 | Emery |
| 2003/0010826 | A1 | 1/2003 | Dvorkis et al. |
| 2003/0086161 | A1 | 5/2003 | Harris |
| 2003/0179428 | A1 | 9/2003 | Suzuki et al. |
| 2004/0076319 | A1 | 4/2004 | Fauver et al. |
| 2004/0113059 | A1 | 6/2004 | Kawano et al. |
| 2004/0254474 | A1 | 12/2004 | Seibel et al. |
| 2005/0020926 | A1 * | 1/2005 | Wiklof et al. ................. 600/476 |
| 2006/0072874 | A1 | 4/2006 | Johnston et al. |
| 2006/0138238 | A1 | 6/2006 | Johnston et al. |
| 2006/0186325 | A1 | 8/2006 | Johnston et al. |

OTHER PUBLICATIONS

Smithwick et al., "Modeling and Control of a Resonant Fiber Scanner for Laser Scanning Display or Acquisition," May 22, 2003, Department of Aeronautics and Atronautics and Human Interface Technology Laboratory University of Washington, pp. 1-34.*

Andersen, J. and Seibel, E., "Real-lime Hazard Detection Via Machine Vision for Wearable Low Vision Aids," *5th Intl. Symposium on Wearable Computers, Proceedings of IEEE ISWC* 2001, pp. 182-183.

Johnston, R. et al., U.S. Appl. No. 11/094,017, filed Mar. 29, 2005.

"Engineering Study of an Endoscope Design," *Human Interface Technology*, <www.hitl.washington.edu/research/endoscope/> (Sep. 30, 2004).

"Micro-Optical Fabrication of a Fiber Scanning System," *Human Interface Technology*, <www.hitl.washington.edu/projects/mfabfiber/> (Sep. 29, 2004).

"Q factor" from *Wikipedia, The Free Encyclopedia*, May 20, 2004, <www.en.wikipedia.org/wiki/Q_factor> (Jun. 22, 2004).

Brown, C. et al., "A Novel Design for a Scanning Fiberoptic Endoscope".

Brown, C. et al., "Mechanical Design and Analysis for a Scanning Fiber. Endoscope," *ASME*, BED—vol. 50, pp. 1-2, (2001).

Fauver, M. et al., "Microfabrication of Fiber Optic Scanners," *Proc. of Optical Scanning II, SPIE*, 4773:102-110 (2002).

Johnson, Brent, "Grating Shrinks Endoscope," *Photonics Spectra*, (Oct. 2003), <www.photonics.com/spectra/applications/QX/ASP/aoaid.335/QX/read.htm> (Sep. 30, 2004).

Piyawattanametha, W. et al., "A MEMS Non-Interferometric Differential Confocal Scanning Optical Microscope".

Seibel, E. and Smithwick, Q., "Unique Features of Scanning Fiber Optical Endoscopy," *Annals of Biomedical Engineering*, 28(suppl. 1), S-40 (2000).

Seibel, E. et al., "Prototype Scanning Fiber Endoscope," presented at *SPIE BiOS*, San Jose, CA (Jan. 2002).

Seibel, E. et al., "Single Fiber Flexible Endoscope: General Design for Small Size, High Resolution, and Wide Field of View," *Proc. of the SPIE, Biomonitoring and Endoscopy Technologies*, 4158:pp. 29-39 (2001).

Seven, Richard, "At the UW Hit Lab, There's Virtue in Virtual Reality," *Seattletimes.com*, Apr. 11, 2004, <www.seattletimes.nwsource.com/pacificnw/2004/0411/cover.html> (Jun. 9, 2004).

Smithwick, Q. et al., "Control Aspects of the Single Fiber Scanning Endoscope," *SPIE Optical Fibers and Sensors for Medical Applications*, 4253:176-188 (2001).

Smithwick, Q. et al., "Depth Enhancement Using a Scanning Fiber Optical Endoscope," presented at *SPIE BiOS*, San Jose, CA (Jan. 2002).

Smithwick, Q. et al., "Modeling and Control of a Resonant Fiber Scanner for Laser Scanning Display or Acquisition," Technical Report, Department of Aeronautics and Astronautics and Human Interface Technology Laboratory, University of Washington (May 22, 2003).

Smithwick, Q. et al., "Modeling and Control of the Resonant Fiber Scanner for Laser Scanning Display or Acquisition," *SID 03 Digest*, pp. 1455-1457 (2003).

Tearney, G. et al., "Scanning Single-Mode Fiber Optic Catheter-Endoscope for Optical Coherence Tomography," *Optics Letters*, 21(7):543-545 (Apr. 1, 1996).

Wang, W. et al., "Development of an Optical Waveguide Cantilever Scanner," *Proc. of SPIE*, 4876:72-83 (2002).

Wang, W. et al., "Micromachined Optical Waveguide Cantilever as a Resonant Optical Scanner," *Sensors and Actuators A*, 102:165-175 (2002).

* cited by examiner

| Time | Ideal Position | Actual Position |
|---|---|---|
| $t_1$ | $y_1, z_1$ | $y'_1, z'_1$ |
| $t_2$ | $y_2, z_2$ | $y'_2, z'_2$ |
| $t_3$ | $y_3, z_3$ | $y'_3, z'_3$ |
| $t_4$ | $y_4, z_4$ | $y'_4, z'_4$ |
| $t_5$ | $y_5, z_5$ | $y'_5, z'_5$ |
| $t_6$ | $y_6, z_6$ | $y'_6, z'_6$ |
| $t_7$ | $y_7, z_7$ | $y'_7, z'_7$ |
| $t_8$ | $y_8, z_8$ | $y'_8, z'_8$ |
| $t_9$ | $y_9, z_9$ | $y'_9, z'_9$ |
| ⋮ | ⋮ | ⋮ |
| $t_n$ | $y_n, z_n$ | $y'_n, z'_n$ |

REMAPPING METHODS TO REDUCE DISTORTIONS IN IMAGES

BACKGROUND OF THE INVENTION

The present invention relates generally to calibration and remapping methods for reducing the distortions in an image obtained by a scanning beam device. More specifically, the present invention relates to image remapping and drive remapping methods that reduce distortions caused by positional uncertainties of a scanning element during a scan pattern.

One promising type of scanning beam device is a scanning fiber device. In a scanning fiber device, light is projected out of an end of a single, cantilevered optical fiber. The optical fiber is vibrated and scanned in one or two dimensions in a scan pattern so as to scan an illumination spot through an optional lens system and over a target area. Theoretically, knowing the drive signal that creates the scan pattern of the illumination spot allows a controller to know the exact position of the illumination spot throughout the scan pattern. Consequently, that allows for construction of an image on a pixel by pixel basis. If the scanning fiber device is used to form an image, the light projected out of the end of the optical fiber is modulated during the scan pattern depending on the pixel position so as to form a desired image on the target area. To acquire an image of the target area, the illumination spot is scanned over the target area in the scan pattern and the backscattered light is captured by a photosensor in time series. Because the motion of the fiber is predictable, the sensed light can be correlated with the time position of the capture of the illumination spot on the target area and a two-dimensional image of the target area can be created one pixel at a time. Some exemplary scanning fiber device are described in U.S. Pat. No. 6,294,775 B1 (Seibel) and U.S. Pat. No. 6,563,105 B2 (Seibel) and U.S. Patent Application Publication Nos. 2001/0055462 A1 (Seibel) and 2002/0064341 A1 (Seibel), the complete disclosures of which are incorporated herein by reference.

However, in order to properly construct the image on a pixel-by-pixel basis, the precise positional information of the scanning element, such as the optical fiber should be known by a controller for each and every point in time of the scan pattern. Any positional inaccuracy (e.g., the illumination spot position is not where it should be) will result in a distortion in the image. Theoretically, knowing the drive signal that is used to scan the optical fiber should allow the controller to know the exact position of the illumination spot at each and every point during the scan pattern. In practice, however, environmental variables and manufacturing variables, such as non linear drive electronic, non-linear drive mechanisms, aberrations in an imaging system of the fiber scanning system, the sensitivity of the scanning fiber device around the resonant frequency, and other factors, add to the positional inaccuracy of the illumination spot during the scan pattern and will add distortion to the image constructed by the scanning fiber device.

While the optical fiber may be scanned at any frequency, in most embodiments, the drive signal is chosen to substantially match the resonant frequency of the optical fiber, since scanning at the resonant frequency provides the desired radial displacements with a minimal use of energy. Scanning at the resonant frequency, however, puts the illumination spot exactly 180 degrees out of phase with the drive signal. Consequently, the optical fiber is sensitive to frequency changes immediately around the resonant frequency. For example, if the drive signal is not exactly at resonant frequency, the illumination spot moves from 180 degrees out of phase and moves closer to being in-phase with the drive signal, which further adds distortions into the image.

Consequently, what are needed are methods, systems, software, and kits which can reduce image distortion in an image created or acquired by a scanning beam device, such as the scanning fiber device.

BRIEF SUMMARY OF THE INVENTION

The present invention provides methods and systems for reducing the distortions in an image acquired or generated by a scanning beam device.

The methods of the present invention recognize that the distortions introduced into the images repeat for each scan pattern carried out by the scanning beam device. By calibrating and characterizing the actual scan pattern of the illumination spot generated by the scanning beam device, the present invention is able to compensate for the distortions caused by the positional difference between the actual scan pattern and the expected or "ideal" scan pattern. The present invention typically compensates for the difference by remapping the image itself and/or by remapping the drive signal so that the actual scan pattern will substantially match the ideal scan pattern.

The calibration methods of the present invention are typically carried out in a calibration chamber. The calibration chamber is sized and shaped to receive the scanning beam device. The calibration chamber comprises a sensor, such as a photosensitive position sensor. The scanning beam device will be positioned so as to scan a beam of light onto the photosensitive position sensor. The photosensitive position sensor tracks the position of the scanning illumination spot that hits the photosensitive position sensor at various time points in the scan pattern. The time points and the corresponding position of the illumination spot may then be temporarily or permanently stored in a memory in the form of a look-up table or an algorithm, that will include the time points and the corresponding position of the illumination spot.

After the scan pattern of the device is characterized the image may be remapped and/or the drive signal may be remapped to compensate for the distortions that would be otherwise be caused by the difference between the measured scan pattern and the ideal scan pattern.

In the image remapping methods, after the scan pattern is characterized, (e.g., scanning an illumination spot in a scan pattern and capturing a position of the scanning illumination spot at selected time points in the scan pattern.) the scanning beam device may be positioned adjacent a target area and the illumination spot is scanned over the target area in the same scan pattern. Backscattered light is captured from the target area at a plurality of time points in the scan pattern and an image of the target area is constructed by placing the captured backscattered light in a pixel position in the image that corresponds to a position of the illumination spot for the same time point in the scan pattern during the capturing step.

The image remapping systems of the present invention comprise a memory coupled to a processor, the memory is configured to store a plurality of code modules for execution by the processor. The plurality of code modules comprise a calibration code module for capturing a position of an illumination spot and synchronizing the position with its time point in the scan pattern, a storage code module for storing the captured positions of the illumination spot with the corresponding time points, and an image code module for constructing an image of a target site on a pixel-by-pixel basis, wherein the image code module is configured to place collected backscattered light from a target area in a pixel position in the image that corresponds to the stored, captured positions at the corresponding time points in the scan pattern.

In the drive signal remapping methods, the drive signal is remapped so that the actual scan pattern of the illumination spot will more closely resemble the expected or "ideal" scan pattern. The drive signal remapping methods comprise enabling an illumination source to deliver illumination to an imaging element and driving the imaging element with a drive signal to scan an illumination spot in a scan pattern. A position of the scanning illumination spot is captured at a plurality of time points in the scan pattern and the captured position of the illumination spots are compared to an ideal position of the illumination spots at selected time points in the scan pattern. The comparison is used as part of an algorithm to remap the drive signal. The remapped drive signal will scan the illumination spot more closely to the ideal positions at each of the selected time points.

The drive signal remapping systems of the present invention comprise a memory coupled to a processor. The memory is configured to store a plurality of code modules for execution by the processor. The plurality of code modules comprise a code module for driving the imaging element with a drive signal to scan an illumination spot in a scan pattern, a code module for capturing a position of the scanning illumination spot at a plurality of time points in the scan pattern, a code module for comparing the captured position of the illumination spots and an ideal position of the illumination spots, and a module for using the comparison to remap the drive signal so that in subsequent driving of the imaging element, the scanning illumination spot will more closely correspond to the ideal positions of the illumination spot.

In yet another aspect, the present invention provides methods and systems that implement both a drive remapping method and an image remapping method to reduce distortions in images. In such methods, a drive signal is provided to scan an illumination spot in a scan pattern. The drive signal is remapped to remap the scan pattern of the illumination spot to substantially correspond to an ideal scan pattern. The remapped drive signal is used to scan the illumination spot in the remapped scan pattern. A position of the illumination spot is captured at selected time points in the scan pattern and the position and time point information is saved.

Thereafter, the scanning beam device is positioned adjacent a target area. The remapped drive signal is used to scan the illumination spot over the target area in the remapped scan pattern. Backscattered light is collected from the target area at a plurality of time points in the scan pattern and an image of the target area is constructed by placing the captured backscattered light captured at the plurality of time point in a pixel position in the image that corresponds to the saved position of the illumination spot for the same time points in the remapped scan pattern.

Other aspects, objects and advantages of the invention will be apparent from the detailed description that follows.

DETAILED DESCRIPTION OF THE INVENTION

The present invention provides methods and systems that calibrate and characterize a scan pattern of a scanning beam systems and remap an image and/or remap a drive signal to reduce distortions that may be introduced into an image constructed by the scanning beam system.

The scanning beam systems of the present invention will include a scanning beam device and a base station for controlling the scanning beam device. The scanning beam devices of the present invention may take on a variety of forms, but are typically in the form of an endoscope, catheter, fiberscope, microscope, boroscope, bar code reader, an image display, or other devices for generating images or acquiring images of a target area. The scanning beam devices of the present invention may be a limited use device (e.g., disposable device) or a multiple-use device. If the device is for medical use, the scanning beam devices will generally be sterile, either being sterilizable or being provided in hermetically sealed package for use.

The scanning beam devices of the present invention include a scanning element for scanning a beam of light onto a target area. The scanning element preferably comprises a single, cantilevered optical fiber, but in other embodiments, the scanning element may take the form of mirrors, such as microelectomechanical system (MEMS), galvanometer, a polygon, multiple optical elements moved relative to each other, or the like. While the remaining discussion focuses on scanning fiber device that is used for acquiring images of a target site, it will be appreciated that the present invention also encompasses the other aforementioned devices.

Figure 1:
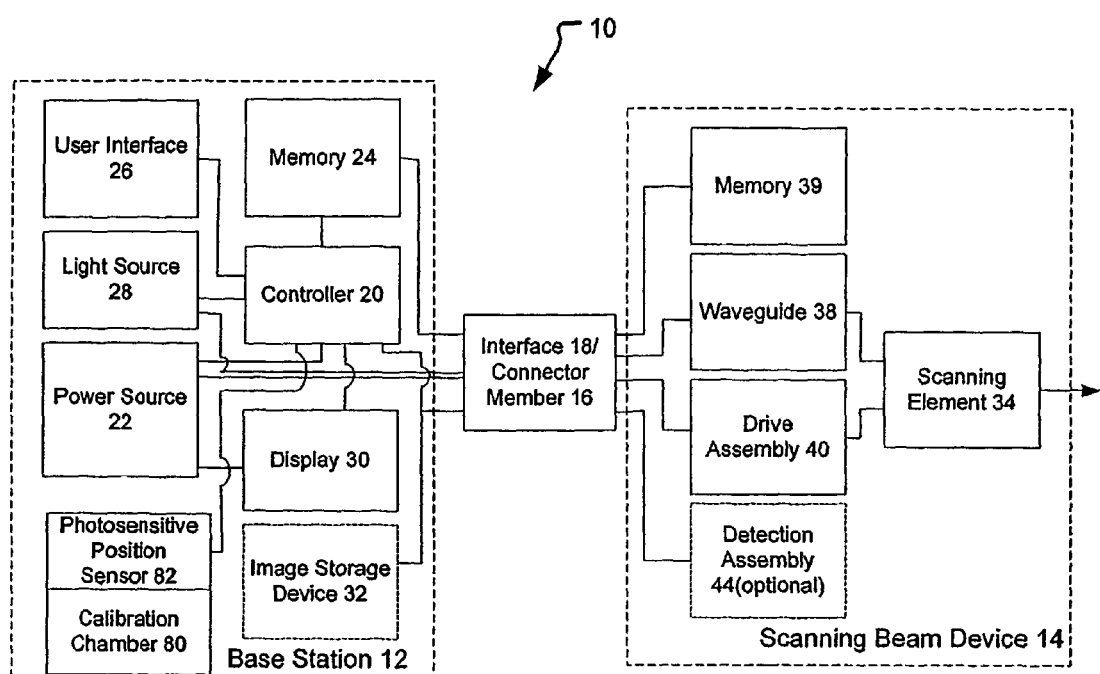
FIG. 1 schematically illustrates a scanning beam system encompassed by the present invention.
Figure 2:
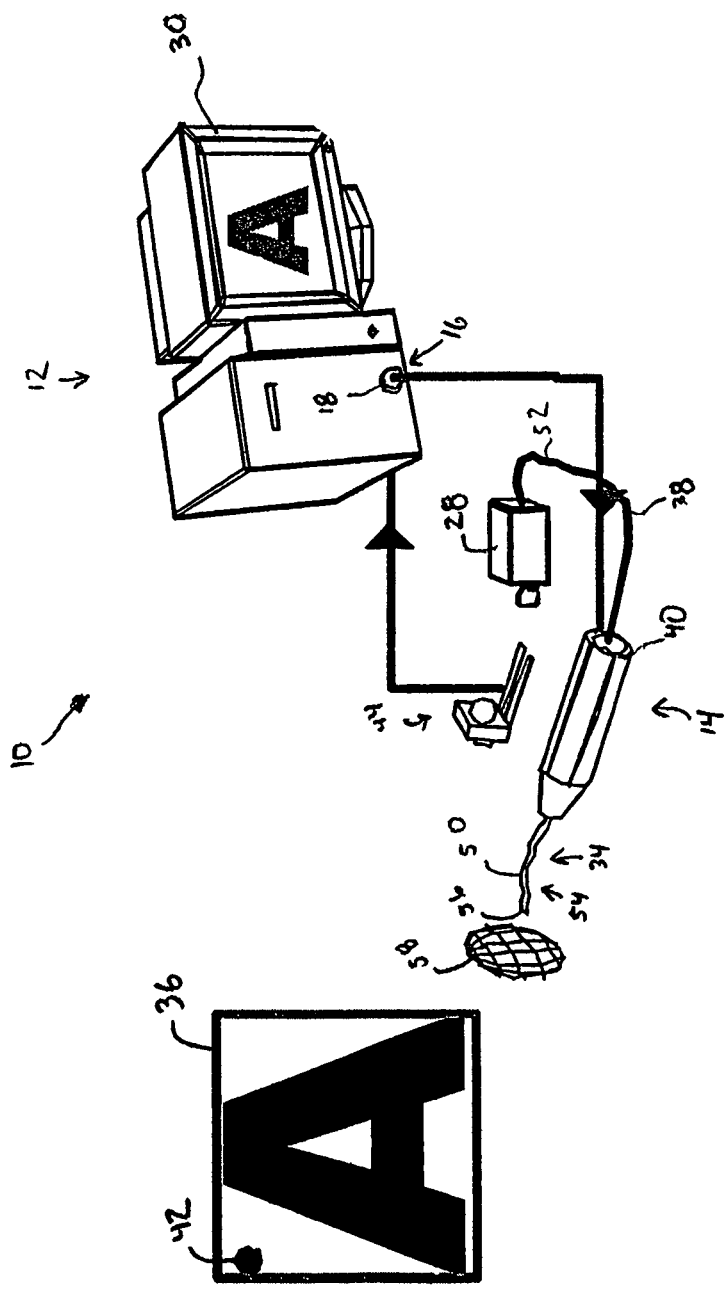
FIG. 2 illustrates a simplified scanning fiber system encompassed by the present invention.

FIGS. 1 and 2 illustrate scanning beam systems 10 that are encompassed by the present invention. The scanning beam system 10 includes a base station 12 and a scanning beam device 14. The scanning beam device 14 includes a connector member 16 that is configured to mate with an input interface 18 on the base station. Coupling of the connector member 16 to the input interface 18 may create a power path, drive signal path, detector path, illumination path, and/or data communication path between elements of the base station 12 and related elements of the scanning beam device 14.

As shown in FIG. 1, base station 12 typically includes a controller 20 that has one or more microprocessors and/or one or more dedicated electronics circuits which may include a gate array (not shown) which may control the actuation of the scanning beam device 14 and generation of the images. The controller 20 may also include scanner drive electronics, detector amplifiers and A/D converters (not shown). The drive electronics in the controller and the software modules stored in memory are used to provide a customized control routine for the scanning beam device 14. As will be appreciated by those of skill in the art, the methods of the present invention may be carried out by the software modules and/or by the electronics hardware in the controller.

Controller 20 is in communication with a plurality of elements within the base station 12 via a communication bus (not shown). The communication bus typically allows for electrical communication between controller 20, a power source 22, memory 24, user interface(s) 26, one or more light sources 28, one or more output displays 30, and a photosensitive position sensor 82. Optionally, if the scanning beam device 14 includes a detection assembly, the base station 12 may include a separate image storage device 32 in communication with controller 20. In alternative embodiments, the image storage device 32 may simply be a module within memory 24. As can be appreciated, the base stations 12 of the present invention will vary, and may include fewer or more elements than illustrated in FIG. 1.

Depending on the particular scanning beam device 14 used, the light source 28 may emit a continuous stream of light, modulated light, or a stream of light pulses. Base station 12 may comprise a plurality of different light sources 28 so as to be able to operate different scanning beam devices that have different illumination capabilities. The light sources 28 may include one or more of a red light source, blue light source, green light source (collectively referred to herein as a "RGB light source"), an IR light source, a UV light source, and/or a high intensity laser source (typically for a therapeutic scanning beam device). The light sources 28 themselves may be configured to be switchable between a first mode (e.g., continuous stream) and a second mode (e.g., stream of light pulses). For ease of reference, other conventional elements in the light source are not shown. For example, if a RGB light source is used, the light sources may include a combiner to combine the different light before it enters the optical fiber 50. Furthermore, while light source 28 is illustrated in FIG. 2 as being separate from base station 12, it should be appreciated that in other embodiments, light sources 28 may be integrated within base station 12.

Memory 24 may be used for storing the software modules, look-up tables, and algorithms that control the operation and calibration of the scanning beam device 14. The control routine used by the controller 20 for controlling the scanning beam device 14 will typically be configurable so as to match the operating parameters of the attached device (e.g., resonant frequency, voltage limits, zoom capability, color capability, etc.). As noted below, memory 24 may also be used for storing the image data received from the detectors 46 of the scanning beam device, remapping look-up tables and algorithms, remapped drive signals, parameters of the fiber scanning device, etc. may also be stored in memory 24, if desired.

For ease of reference, other conventional elements in the base station 12 are not shown. For example, embodiments of the base stations 12 of the present invention will typically include conventional elements such as amplifiers, D/A converters and A/D converters, clocks, waveform generators, and the like.

The scanning beam devices 14 of the present invention will includes a scanning element 34 for delivering and scanning a beam of light onto a target area 36. A waveguide 38, typically in the form of an optical fiber, is optically coupled to the light source(s) so as to deliver illumination from the light source 28 to the scanning element 34. A driving assembly 40 is coupled to the scanning element 34 and is adapted to actuate the scanning element 34 according to a drive signal received from the controller 20. Optionally, the scanning beam device 14 may include a non-volatile memory 39 for storing identification data or parametric data of the scanning beam device 14.

In a preferred embodiment, the scanning element 34 is a cantilevered optical fiber 50. The optical fiber 50 will comprise a proximal portion 52 and a distal portion 54 that comprises a distal tip 56. Optical fiber 50 is typically fixed along at least one point of the optical fiber so as to be cantilevered such that the distal portion 54 is free to be deflected. In such an embodiment, the proximal portion 52 of the optical fiber is the waveguide 38 and will transmit light from light source 28. As can be appreciated, in other embodiments, a separate waveguide 38 may be optically coupled to the proximal portion 52 of the optical fiber so that light from light source 28 will be directed into the optical fiber 50 and out of the distal tip 56.

The optical fiber 50 may have any desired dimensions and cross-sectional shape. The optical fiber 50 may have a symmetrical cross sectional profile or an asymmetrical cross-sectional profile, depending on the desired characteristics of the device. An optical fiber 50 with a round cross-section will have substantially the same resonance characteristics about any two orthogonal axes, while an optical fiber with an asymmetric cross section (e.g., ellipse) will have different resonant frequencies about the major and minor axes. If desired, the optical fiber 50 may be linearly or non-linearly tapered.

Figure 3A:
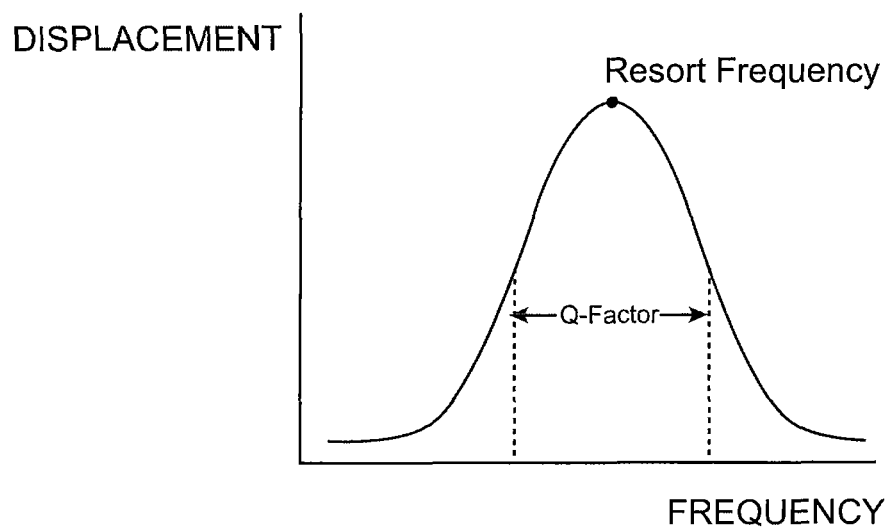
FIG. 3A illustrates a Q-factor around the resonant frequency.

To achieve the deflection of the distal portion 54 of the optical fiber, the cantilevered distal portion 54 of the optical fiber 50 will be coupled to drive assembly 40. As shown in FIG. 3A, drive assembly 40 will typically drive the cantilevered distal portion 54 within a Q-factor of the resonant frequency, and preferably at its mechanical or vibratory resonant frequency (or harmonics of the resonant frequency) in a one or two dimensional scan pattern. As can be appreciated, the scanning element 34 does not have to be driven at substantially the resonant frequency, but if the scanning element 34 is not scanned at its resonant frequency, a larger amount of energy will be required to provide the desired radial displacement for the scan pattern. In one preferred embodiment, the drive assembly is a piezoelectric driving assembly. A drive signal from controller 20 delivers a desired signal to the drive assembly 40. The drive signal causes the piezoelectric drive assembly to deflect the distal tip 56 of the optical fiber 50 so that the illumination spot is moved in a desired scan. While preferred drive assemblies are piezoelectric assemblies, in alternative embodiments, the drive assembly 40 may comprise a permanent magnet, a electromagnet, an electrostatic drive, a sonic drive, an electromechanical drive, or the like.

Figure 3B:
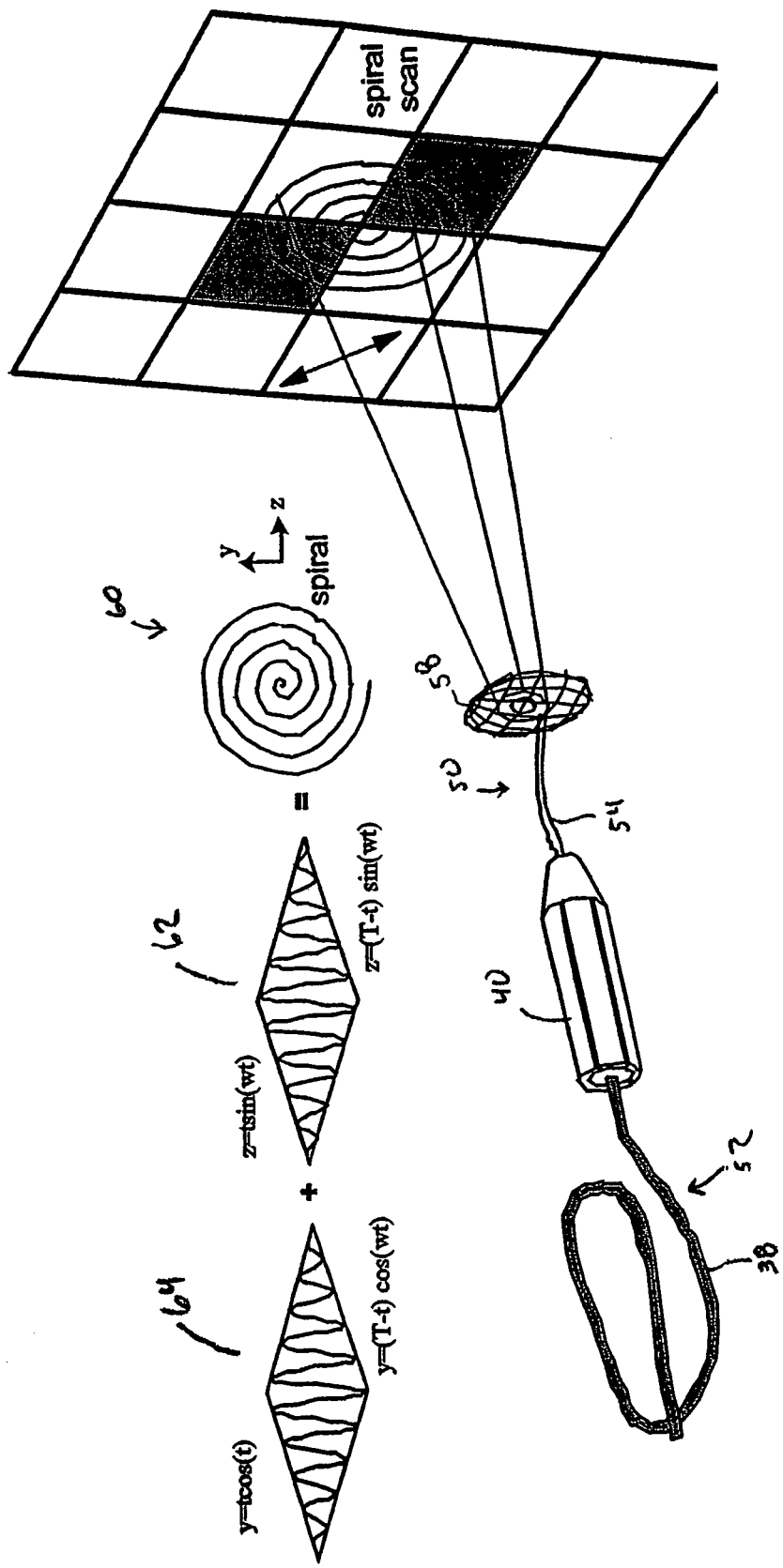
FIG. 3B illustrates a horizontal and vertical drive signal that generates a spiral scan pattern encompassed by the present invention.

A variety of different scan patterns may be implemented by the drive signal. FIG. 3B illustrates one 2-D spiral scan pattern encompassed by the present invention. The spiral scan pattern 60 is created by synchronizing a horizontal sinusoidal vibration drive signal 62 and a vertical sinusoidal vibration drive signal 64. The illustrated example signals are amplitude modulated in a triangle pattern. Typically, the horizontal and vertical drive signals are driven with a 90 degree phase shift between them. If the optical fiber is circular, the horizontal and vertical resonant vibrations are of the same frequency and equal amplitude (but still 90 degrees out of phase). The drive signals shown in FIG. 3B are referred to herein as a "triangle amplitude modulated sinewave." Such drive signals cause the illumination spot to start at a center point and spiral outward until a maximum diameter circle is created. The maximum diameter of the circle is limited by the amplitude of the sinusoid at the top of the ramp (and the mechanical properties of the fiber). The decreasing portion of the triangle amplitude modulated sinewave may optionally be used to cause the illumination spot to spiral inward back toward the center point. As can be appreciated, back scattered light may be captured on only one of the increasing and decreasing scan patterns, but if desired, the back scattered light from the illumination spot may be captured on both the increasing and decreasing scan patterns. As can be appreciated, the spiral scan pattern is merely one example of a scan pattern and other scan patterns, such as a rotating propeller scan pattern, a raster scan pattern, a line pattern, and the like, may be used by the present invention to scan the illumination spot on the target area.

Referring again to FIG. 2, the device 14 may optionally comprise one or more lenses 58 near the distal end of the optical fiber 50 to focus the imaging light, to provide better resolution, and/or an improved FOV. The lenses 58 may be coupled to an outer housing (not shown) of the scanning fiber device 14 and fixed relative to the scanning distal end 56 of the optical fiber and/or the lens 58 may be movable relative to the housing (not shown).

A detection assembly 44 may comprise one or more detectors that are in communication with the controller. The detectors are typically coupled to the controller through an amplifier and A/D converter (not shown). The controller (or drive electronics within the controller) may provide a synchronization pulse to provide a timing signal for the data acquisition by the detection assembly 44. Additionally or alternatively, a separate clock circuit (not shown) may be used to correspond the detected light to the time points in the scan pattern. The detection assembly 44 may be disposed anywhere on or within the housing of the scanning fiber device, but will typically be positioned adjacent the distal portion 54 of optical fiber 50 so as to capture backscattered light reflected off of the target area 36. The detection assembly 44 may comprise one of more individual detectors to receive light backscattered from the target area 36. For example, the detection assembly may comprise a light detector (such as a photodetector) that produces electrical signal that are conveyed through leads (not shown) to the base station 12. Alternatively, the detection assembly 44 may comprise one or more collector fibers (not shown) that transmit light reflected from the target area to photodetectors in the base station 12.

To acquire an image of a target area 36 with the scanning fiber device 14, light is delivered from light source 28 through the waveguide 38 and projected out of the distal end 56 of the optical fiber so as to form an illumination spot 42 on the target area 36. A drive signal is delivered through the power source so that the piezoelectric drive assembly 40 vibrates the optical fiber substantially at its resonant frequency and scans the illumination spot in a scan pattern over the target area 36. Backscattered light from the target is sequentially collected by the detection assembly 44 and its collection times are synchronized with its time point in the scan pattern. Based on the known position of the illumination spot at all points of the scan pattern, the sequentially collected light may then be placed in a pixel position that corresponds to the position of the illumination spot at that particular time of the scan pattern to construct an image of the target area one pixel at a time.

If the position of the illumination spot after passing through the lens during the actual scan substantially corresponds to the "ideal" spiral scan pattern for substantially every time point of the scan pattern, the captured back scattered light may be accurately placed in its appropriate pixel position on the constructed image and the constructed image of the target area will accurately reproduce the image of the target area. However, a variety of factors will affect the position of the illumination spot during the scan pattern and the actual scan pattern of the illumination spot will not always correspond to the ideal scan pattern. For example, when both axes of the optical fiber have the same or nearly the same resonant frequency, energy can leak from one drive axis to the other axis, thus affecting the position of the illumination spot during the scan pattern. Also, the resonant frequency of the optical fiber may change slightly with the amplitude of the drive signal, which further affects the position of the illumination spot during the scan pattern. Moreover, environmental factors, non-linear drive electronics, changes in the characteristics of the drive assembly over time, resonant frequency phase issues, lens distortions, and/or aberrations in the optical systems of the device will affect the position of the illumination spot during the scan pattern.

Figures 4, 4A:
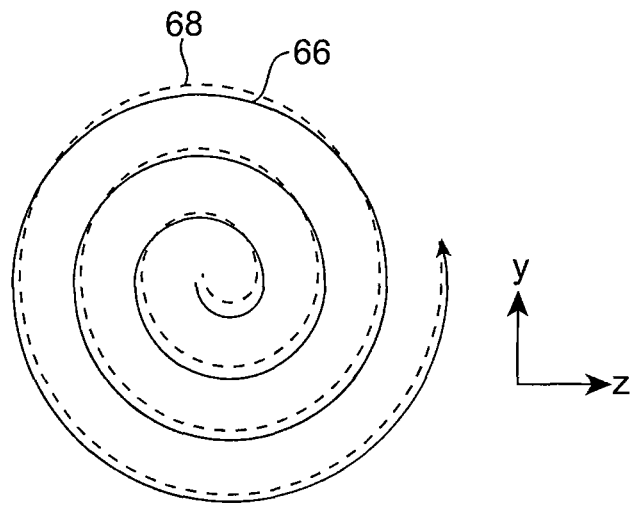
FIG. 4 illustrates an example of an ideal spiral scan pattern and a different, actual scan pattern.
FIG. 4A illustrates a sample look-up table that provides a list of time points in the scan pattern, an ideal position of the illumination spot for the corresponding time point in the scan pattern (optional), and a measured position of the illumination spot for the corresponding time point in the scan pattern.

Consequently, as shown in FIG. 4, in which the solid spirals indicate the path of the illumination spot for an ideal scan pattern 66 and the dotted spirals indicate a path of the illumination spot of a non-matching scan pattern 68, the actual position of the illumination spot will not always match an expected "ideal" position of the scan pattern. For example, as shown in FIG. 4A, at a first specified time point after the start of the scan pattern ($t_1$), if the illumination spot follows the ideal scan pattern, the illumination spot should be at a position $y_1$, $z_1$. However, because of the factors described above, during an actual scan pattern, the illumination spot at $t_1$ may actually be at a position $y'_1$, $z'_1$. Thus, during reconstruction of the image, instead of placing the captured backscattered light (e.g., image pixel) in their correct pixel positions at each of the selected time points in the scan pattern, (e.g., the actual positions $y'_1$, $z'_1$, $y'_2$, $z'_2$ . . . $y'_n$, $z'_n$,) the captured backscattered light will be incorrectly placed in their ideal pixel positions (e.g., $y_1$, $z_1$, $y_2$, $z_2$ . . . $y_n$, $z_n$,). As can be appreciated, when $y_n$, $z_n$ is not substantially equal to $y'_n$, $z'_n$, placement of the pixel in the ideal positions will create distortions in the constructed image, such as chromatic aberrations, phase distortions, and radial distortions (e.g., non equal spacing between spirals).

Even though an actual illumination spot scan pattern will not match an ideal scan pattern, if the illumination spot is scanned substantially at a resonant frequency, the differences between the actual scan pattern and the ideal scan pattern will be repeated for each scan. To reduce the distortions in the images caused by the differences between the ideal scan pattern and the actual scan pattern of the illumination spot, the present invention provides a scan pattern calibration method and a plurality of remapping methods that remove the distortions from the constructed images.

The calibration methods of the present invention characterize the actual scan pattern of the illumination spot. The remapping methods of the present invention will use the calibration method to adjust the scanning methods so as to reduce the distortions in the image. The various remapping methods of the present invention may be used individually or may be used together.

The remapping methods of the present invention will use a look-up table or algorithm to reduce the distortions in the images. The look-up tables or algorithms may be stored on a variety of different computer readable mediums. For example, if the remapping calibration is done by the operator at the base station 12 immediately prior to an imaging procedure, the look-up table may be stored in the memory 24 in the base station 12. Alternatively, if the calibration is performed during manufacturing, the look-up tables may be stored in a non-volatile memory 39 on the scanning fiber device 14. A more complete description of the non-volatile memory in the fiber scanning device is described in co-pending and commonly owned U.S. patent application Ser. No. 10/956,473, filed herewith, entitled "Configuration Memory for a Scanning Beam Device," the complete disclosure of which is incorporated herein by reference. In yet another embodiment, the look-up tables may be stored in a central database that is accessed remotely by the controller over a network, such as a local area network (LAN), a wide area network (WAN), or the internet. In yet other embodiments, the look-up table(s) may be stored in a computer readable medium (e.g., CD, DVD, floppy disk, etc.) that is shipped with the scanning fiber device 14.

As can be appreciated, the remapping look-up tables and algorithms will be specific to the individual scanning fiber devices. As such, the remapping methods of the present invention will first calibrate the scanning fiber device to characterize the actual scan pattern of the illumination spot. Characterization of the scan pattern is carried out by using the ideal drive signal to scan the illumination spot and capturing the actual positions of the illumination spot at selected time points during the scan pattern. The captured positions will be synchronized to their time points in the scan pattern and the time points and captured positions of the illumination spot will be used in the look-up table or in an algorithm.

Figure 5:
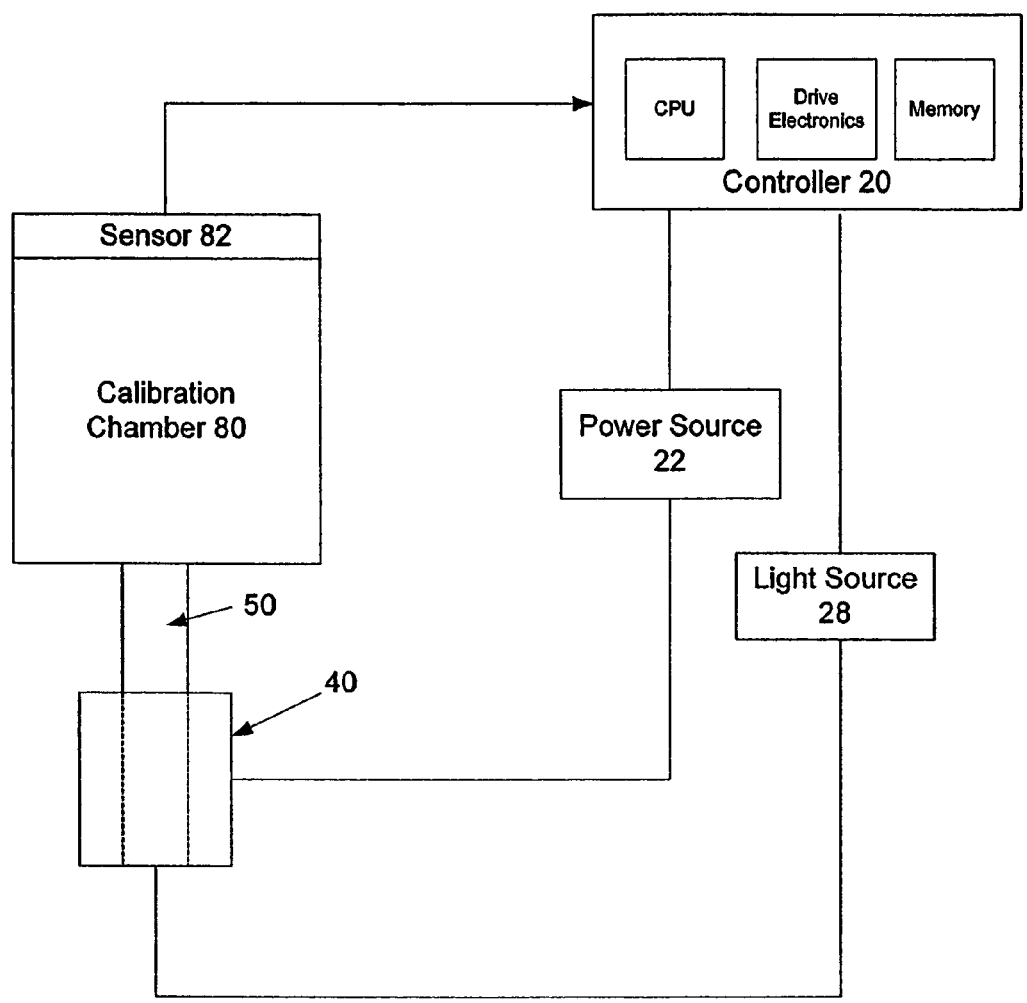
FIG. 5 schematically illustrates a calibration chamber configuration of the present invention.

As shown in FIGS. 1 and 5, characterization of the actual scan pattern is typically carried out in a calibration chamber 80. Calibration chamber 80 may be formed as part of the base station 12, it may be separate from the base station 12, or it may be incorporated as part of the manufacturer's test equipment (not shown). Calibration chamber 80 may be environmentally controlled so as to match the anticipated environments of the scanning fiber devices. Calibration chamber 80 will be sized to receive at least a distal portion of the scanning fiber device 14 and may have a holder (not shown) that positions the scanning fiber device substantially in a center of the calibration chamber 80. Calibration chamber 80 will have a light detector coupled to the controller. The light detector is preferably a position sensitive detector (PSD) 82 that captures the position of the illumination spot during the scan pattern. In use, the controller will be configured to initiate the scanning pattern. Analog signals from the PSD 82 will be sent to the dedicated, specialized hardware electronics in the controller through an A/D converter (not shown) and the controller will correspond the position data with the time points of the scan pattern. Optionally, the calibration chamber may have a temperature controller and a temperature sensor coupled to the controller. Controller may be configured to measure and/or adjust the temperature of the calibration chamber before or after the characterization of the scan pattern of the scanning fiber device.

Because the characteristics of the scanning fiber device 14 may operate differently in different operating modes (e.g., different zoom levels, etc.) or operate differently in different environmental conditions (e.g., temperature, etc.), separate look-up tables or algorithms may be generated when the scanning fiber device is in the calibration chamber 80 for some or all of the selected operation modes and/or environmental conditions. If only selected operation modes or environmental conditions are used to generate a look up table, the controllers of the present invention may be configured to interpolate between the generated look-up tables and algorithms to generate look-up tables for other modes and conditions.

For example, in one configuration, there may be separate look-up table for different zoom levels. Zoom is generally accomplished by reducing the maximum drive voltage delivered to the drive assembly 40 so as to reduce the amplitude of the scanning. However, the different voltages could provide different positional differences other than simple amplitude changes in the optical fiber and illumination spot. As such, it may be desirable to have different look-up tables for the different zoom levels. The zoom capability may be limited to specific zoom levels so that memory is not overloaded with a large number of look-up tables or algorithms. It may be possible to provide a predetermined number of look-up tables for a predetermined spaced zoom levels and any non-characterized zoom level between the predetermined zoom levels may have a look-up table generated by the controller by interpolating between the spaced zoom tables.

Additionally, there may be different remapping tables or algorithms for the different anticipated environmental conditions. For example, the memories in the system 10 may comprise remapping look-up tables or algorithms for a variety of different temperatures or temperature ranges. In such embodiments, the scanning fiber device 14 may comprise a temperature sensor (not shown) that is configured to measure the temperature adjacent the distal tip 56 of the optical fiber 50 and configured to send a temperature signal to the controller so that the controller will know which look-up table or algorithm to use. Similar to the zoom tables, it may be desirable to only generate look-up tables for two or more temperatures or temperature ranges. The look-up tables for the two or more temperatures may thereafter be interpolated to generate the look-up tables for the remaining temperatures or temperature ranges.

Figure 6:
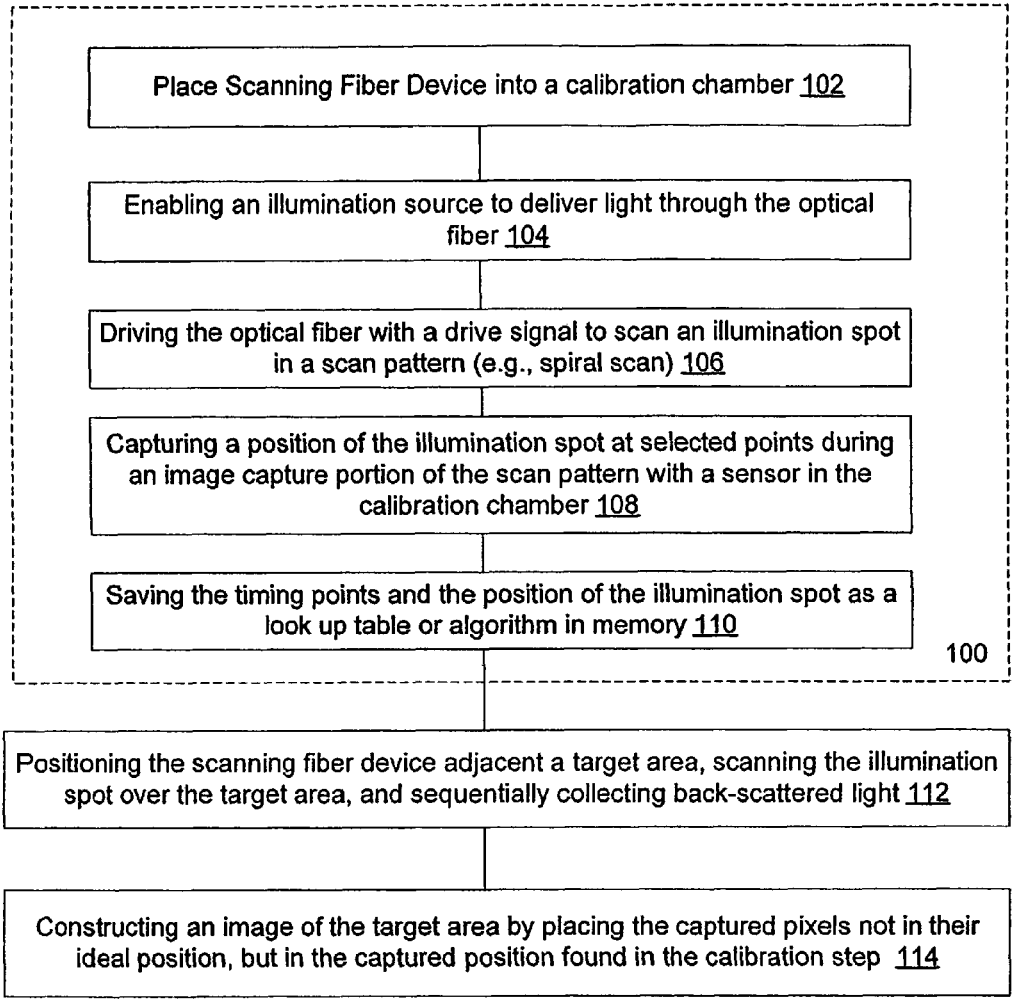
FIG. 6 is a flowchart which illustrates an exemplary image remapping method encompassed by the present invention.

FIGS. 5 and 6 illustrate one simplified image remapping method encompassed by the present invention. The first step in the image remapping method comprises characterizing the actual scan pattern of the scanning fiber device, step 100. In a preferred embodiment, the characterization step 100 is carried out by placing the scanning fiber device in a calibration chamber 80 (see FIG. 5), step 102. The illumination source 28 is enabled to allow light to be delivered through optical fiber 50, step 104. A drive signal is delivered to the piezoelectric assembly to scan the illumination spot in a scan pattern, such as the spiral scan pattern shown in FIG. 3B, step 106. The position of the illumination spots are captured by the sensor 82 in the calibration chamber 80 at selected points ($t_1$, $t_2$, $t_3$ ... $t_n$) of a desired image capture portion of the scan pattern and are saved together in memory in a look up table, steps 108, 110. Any desired number of positions of the illumination spots may be captured. Typically, the time points are under sampled and spaced equally from each other throughout the scan pattern. Thereafter, it may be desirable to interpolate between the captured time points to obtain the remaining points for the look-up table. By not generating every point in the scan pattern, a slower D/A may be used, and the overall cost of the system 10 may be reduced. As shown in FIG. 4A, ideally the timing of the captured points are set to the same timing as would be used to capture image pixels and the captured position data are indexed in the look-up table with a time or number past the initiation of the drive signal/start of the scan.

Optionally, to reduce the effect of noise during the characterization of the scan pattern, the scan pattern may be repeated multiple times and capturing of the positions of the illumination spot may be carried out multiple times. Thereafter, the controller may calculate an average position ($y_{n,avg}$, $z_{n,avg}$) of the illumination spot for each time point ($t_1$, $t_2$, ... $t_n$) and the average position may be saved in the look-up table or used in the algorithm (See FIG. 4A).

After the scan pattern is characterized, the scanning fiber device is ready for use. If the scanning fiber device is an endoscope, the scanning fiber device may be advanced through the body and positioned adjacent the target area (e.g., body lumen, body cavity, hollow organ, etc.). The same drive signal used to scan the illumination spot in the characterization step (step 100) is also used to scan the illumination spot over the target area. Backscattered light from the target area is then sequentially collected, step 112. Thereafter, during image reconstruction, instead of placing the image pixels in their ideal pixel position based on the time point in the ideal scan pattern, the image pixels are placed in the captured positions (e.g., $y'_1$, $z'_1$, $y'_2$, $z'_2$ ... $y'_n$, $z'_n$,) found in the calibration step for each of the corresponding time points ($t_1$, $t_2$, ... $t_n$) of the scan pattern, step 114.

Figure 7A:
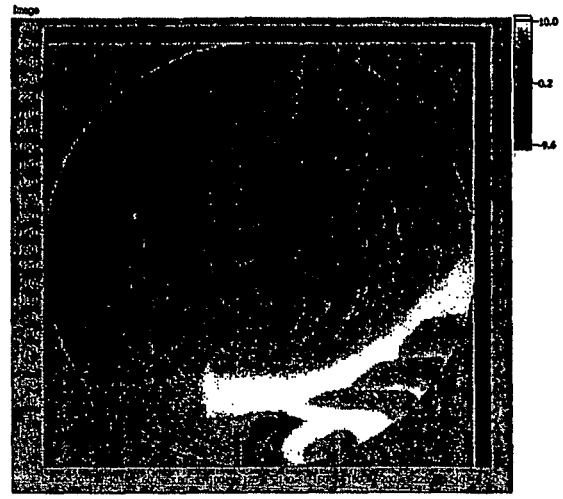
FIG. 7A is an image before an image remapping method of the present invention is applied to the image.
Figure 7B:
FIG. 7B is the image of FIG. 7A after the image remapping of the present invention is applied to the image.

FIG. 7A illustrates an image before image remapping and FIG. 7B illustrates an image after image remapping.

Figure 8:
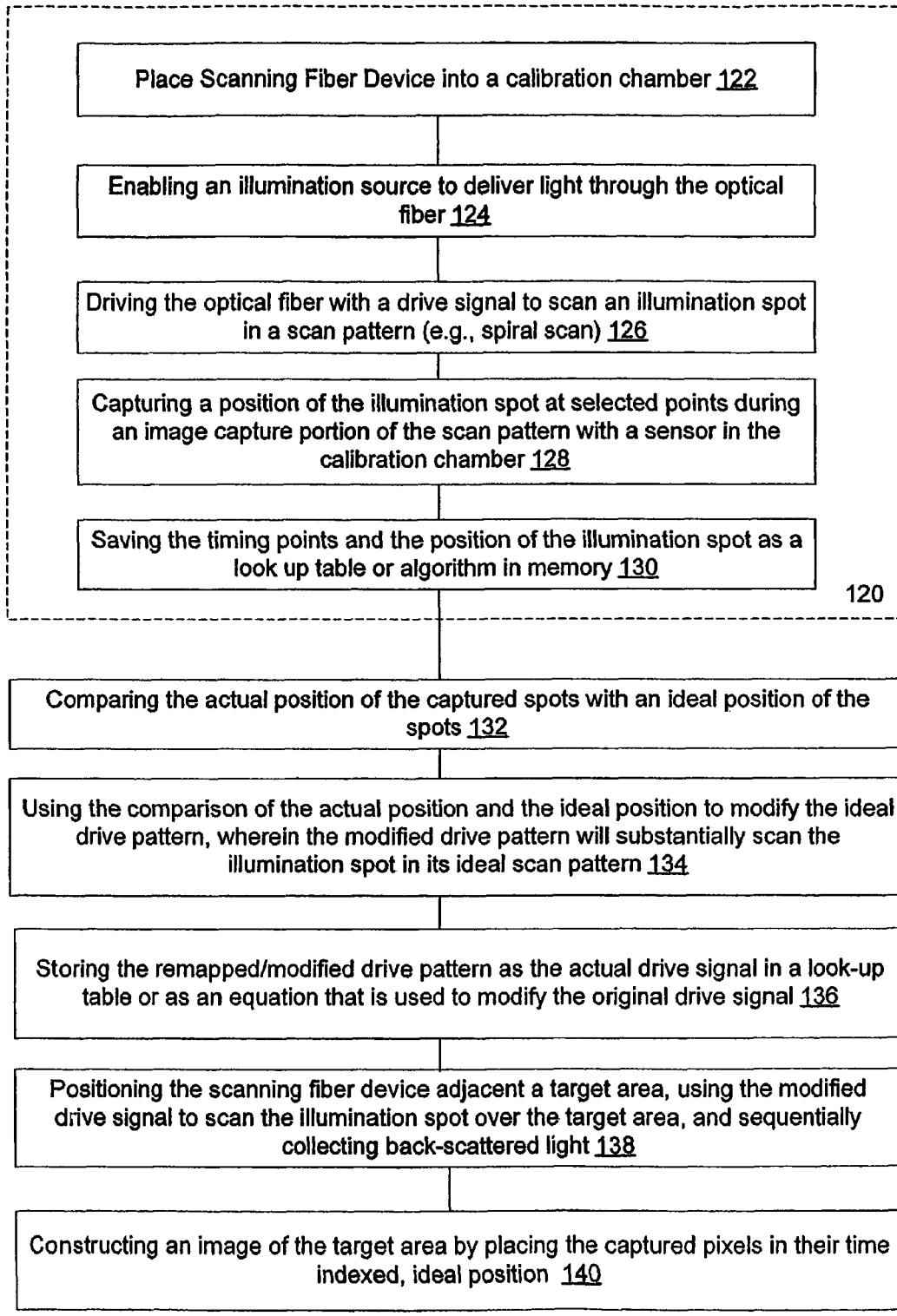
FIG. 8 is a flowchart which illustrates an exemplary drive remapping method encompassed by the present invention.

FIG. 8 schematically illustrates a drive remapping method encompassed by the present invention. Similar to the image remapping method, the drive remapping method of FIG. 8 comprises characterizing the scan pattern, step 120. Similar to above, the characterization step 120 is carried out by placing the scanning fiber device in a calibration chamber 80 (see FIG. 5), step 122. The illumination source 28 is enabled to allow light to be delivered through optical fiber 50, step 124. A drive signal is delivered to the piezoelectric assembly 40 to scan the optical fiber 50 in a scan pattern, such as the spiral scan pattern shown in FIG. 3B, step 126. The position of the illumination spots are captured by the sensor 82 in the calibration chamber 80 at selected points ($t_1$, $t_2$, $t_3$ ... $t_n$) of a desired image capture portion of the scan pattern and may optionally be saved together (either temporarily or permanently) in memory in a look up table, steps 128, 130. If desired, the corresponding "ideal" points (e.g., $y_n$, $z_n$) for each of the time points may also be saved in the look-up table.

At step 132, the captured points are compared to the ideal points (e.g., the location of the illumination spots if the actual scan pattern had followed the ideal scan pattern.) at some or all of the time points in the look up table. The comparison is then used to remap or otherwise modify the original drive signal (step 134). The drive signal will be modified so that when the modified drive signal is used to drive the optical fiber, the position of the illumination spot will substantially correspond to the ideal positions of the original "ideal" drive signal. The modified drive signal may then be stored as a new drive signal as a look-up table that will thereafter be used to drive the optical fiber. Alternatively, an algorithm that modifies the original drive signal may be stored in memory, step 136.

A variety of different methods may be used to modify the drive signal. For example, a real-time closed loop feedback control in the form of dedicated electronic hardware in the controller may be coupled with the calibration chamber to control and implement the real-time control loop until the measured scan pattern falls within predetermined tolerances of the ideal scan pattern. Thereafter, the drive signal used by the feedback control loop to drive the optical fiber can be captured and used as the modified drive signal.

Another method of modifying the drive signal includes using parametric characteristics of the scanning fiber device and inputting such parametric characteristics into a software algorithm to calculate a drive signal that will provide the desired scan pattern (i.e., the ideal scan pattern). In such embodiments, the parametric characteristics of the scanning fiber device may be saved in a memory 39 on the scanning fiber device 14, in the memory 24 of the base station 12, or in a remote database that may be accessed over a network.

Yet another method of modifying the ideal drive signal comprises using an iterative method to incrementally modify the drive signal such that each incremental change to the drive signal will modify the scan pattern to be closer to the ideal scan pattern. The incremental modifications to the drive signal can be continued until the resultant scan pattern is within an predetermined error tolerance limit. Once the measured scan pattern is within such a limit, the drive signal may be captured and thereafter used as the modified drive signal. While the iterative method is slower than the real time control loop, such a method has much less computational requirements and can use a slower, less expensive controller. Moreover, the iterative method may be carried out with a software module, instead of a dedicated real-time electronic hardware.

As can be appreciated, the above methods used to modify the drive signal are merely examples, and other conventional or proprietary methods of modifying the drive signal may be used by the present invention.

After the modified drive signal is captured and stored in a memory as a look-up table or as an equation/algorithm to modify the original drive signal, the scanning fiber device is ready for use. If the scanning fiber device is an endoscope, the scanning fiber device may be advanced through the body and positioned adjacent the target area (e.g., body lumen, body cavity, hollow organ, etc.). The illumination spot is scanned with the modified drive signal, and the backscattered light is sequentially collected, step 138. Thereafter, during image reconstruction, the image pixels are placed in their ideal pixel position based on the time point in the scan pattern, step 140.

Advantageously, the drive remapping methods illustrated in FIG. 8 requires a much smaller look-up table than the image remapping methods illustrated in FIG. 6. For example, while any number of points may be used for each spiral, a typical number of "drive points" per spiral may be between about 20 points and about 50 points, while a typical number of "pixel points" per spiral may be two thousand, or more. Thus, for a 250 spiral image with two 16 bit words per point (e.g., one "Z" and one "Y" either drive value or pixel location) a drive remap at 40 points per spiral would require only 40 KB of information. In contrast, an image remap at 2000 points per spiral would require over 2 MB of information. As can be appreciated, the methods of the present invention are not limited to the number of points and spirals, and any number of desired drive points and spirals may be used.

While the image remapping methods may require more memory, the image remapping methods provide additional advantages. For example, the image remapping method are straightforward to implement and require much less computational power from the controller to achieve. Moreover, image remapping can correct for chromatic aberrations in three simultaneous color systems that are caused by aberrations in the lenses. For example, aberrations in the lenses may actually place different illumination spots for the different colors (e.g., red, green, blue) on the target area. By computing separate image remapping look-up tables for each color, much of the chromatic aberrations may be removed during the image remapping. Advantageously, because the image remapping methods of the present invention can remove chromatic aberrations, the systems of the present invention would not require the highest quality lenses and less expensive lenses may be used without degrading the images.

Figure 9:
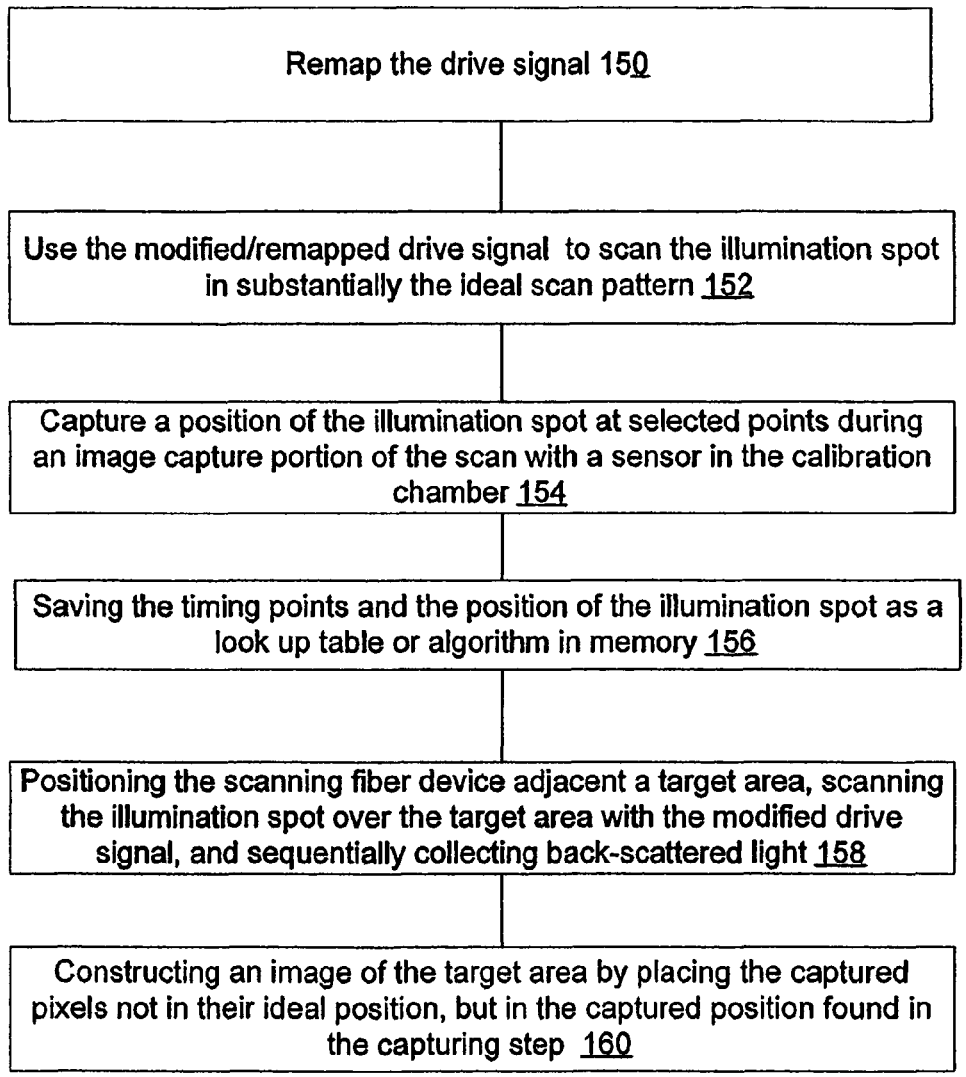
FIG. 9 is a simplified flowchart which illustrates an exemplary method that uses both an image remapping method and a drive remapping method to reduce the distortions in the image.

FIG. 9 illustrates a method in which both the drive remapping method and image remapping method are used to reduce the distortions in the constructed image. The drive remapping method is effective at removing radial distortions and preventing the number of unfilled pixels that may occur with image remapping. Thus, when used together, the combined methods are more fully able to remove the radial and phase distortions from the image. As shown in FIG. 9, the method comprises applying the drive remapping method as described above so as to modify/remap the original drive signal, step 150. Remapping of the drive signal generally includes steps 120-136 of the method shown in FIG. 8. The remapped drive signal will be saved in memory and used to drive the optical fiber so as to force the illumination spot to scan in a radial pattern that substantially matches the ideal scan pattern, step 152. As can be appreciated, the remapped drive signal will typically not completely match the ideal scan pattern to the actual scan pattern, and some differences will still remain. To remove the remaining distortions that would be caused by the differences between the actual scan pattern and the ideal scan pattern, the actual scan pattern (from the modified drive signal) will be captured by the sensor 82 in the calibration chamber 80 at selected points ($t_1, t_2, t_3 \ldots t_n$) and characterized, step 154. The position of the illumination spots and the time points are synchronized and saved together in memory as a look up table or algorithm, step 156.

After the scan pattern is characterized, the scanning fiber device is ready for use. The scanning fiber device is positioned adjacent the target area and the modified drive signal is used to scan the illumination spot over the target area. Backscattered light from the target area is then sequentially collected, step 158. Thereafter, during image reconstruction, instead of placing the image pixels in their ideal pixel position based on the time point in the ideal scan pattern, the image pixels are placed in the captured positions (e.g., $y'_1, z'_1, y'_2, z'_2 \ldots y'_n, z'_n$) found in the capturing step 154 for each of the corresponding time points ($t_1, t_2, \ldots t_n$) of the scan pattern, step 160.

Figure 10:
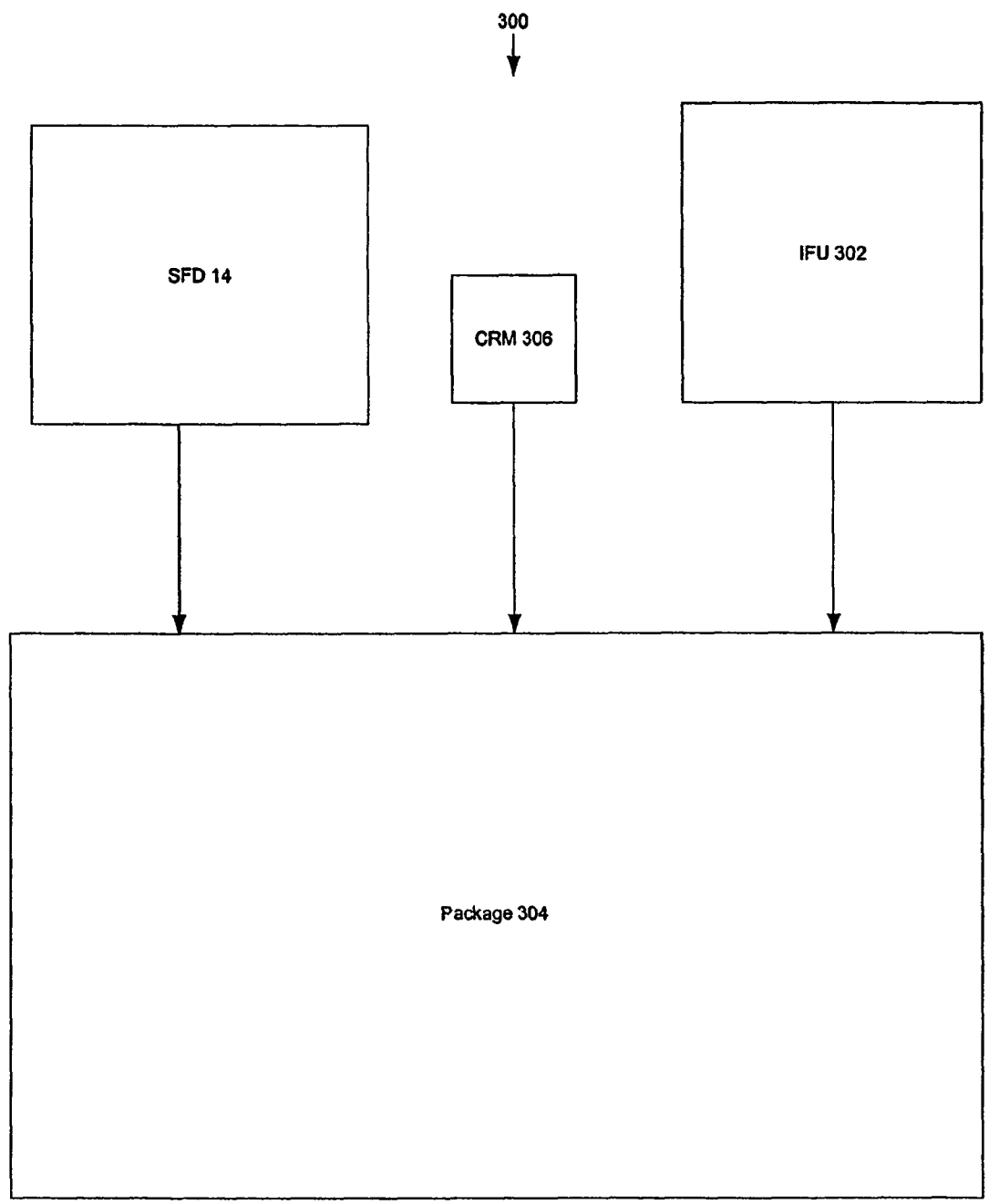
FIG. 10 illustrates a kit encompassed by the present invention.

Referring now to FIG. 10, the present invention also encompasses kits 300. The kit 300 may include a scanning fiber device (SFD) 14 (such as an endoscope), instructions for use (IFU) 302, and at least one package 304. Optionally, the kit 300 may include a computer readable medium (CRM) 306 that is integral with the SFD 14 (such as the non-volatile memory 39) or separate from the SFD (e.g., CD, DVD, floppy disk, etc.)

The scanning fiber device 14 will generally be as described above, and the instruction for use (IFU) 302 will set forth any of the methods described above. Package 304 may be any conventional device packaging, including pouches, trays, boxes, tubes, or the like. IFU 302 will usually be printed on a separate piece of paper, but may also be printed in whole or in part on a portion of the package 304.

The scanning fiber devices may comprise a memory 39 that comprises the image remapping look-up table or algorithm, the remapped drive signal and/or other parametric information regarding the scanning fiber device. Alternatively, a separate computer readable medium 306 may comprise the image remapping look-up table or algorithm, the remapped drive, and/or the parametric data of the scanning fiber device.

It is understood that the examples and embodiments described herein are for illustrative purposes only and that various modifications or changes in light thereof will be suggested to persons skilled in the art and are to be included within the spirit and purview of this application and scope of the appended claims. For example, while the above description focuses on image acquisition, the above systems and methods are equally applicable to image displays. For image display, the difference between the actual scan pattern and the ideal scan pattern will cause the wrong image pixel to be displayed in at least some of the pixel positions. Thus, for image remapping, the look up table would be used to determine which image pixel is displayed, rather than where to store the received pixel image from the sensor. In regards to drive remapping, the look-up table would be used the same way. Numerous different combinations are possible, and such combinations are considered to be part of the present invention.

What is claimed is:

1. A method of remapping an image that is obtained or generated by a scanning beam device, the method comprising:
   a) characterizing a scan pattern of a scanning beam device prior to scanning a target area with the device, the characterizing comprising:
      scanning an illumination spot in a scan pattern; and
      capturing a position of the scanning illumination spot at selected time points in the scan pattern;
   b) positioning the scanning beam device adjacent a target area and scanning the illumination spot over the target area in the scan pattern;
   c) capturing backscattered light from the target area at a plurality of time points in the scan pattern; and
   d) constructing an image of the target area by placing the captured backscattered light in a pixel position that corresponds to the position of the illumination spot for the same time point in the scan pattern during the capturing step.

2. The method of claim 1 wherein the scanning beam device is an endoscope.

3. The method of claim 1 wherein the illumination spot is scanned with a mirror.

4. The method of claim 1 wherein the illumination spot is scanned with a cantilevered optical fiber.

5. The method of claim 4 wherein scanning the illumination spot comprises deflecting the cantilevered optical fiber with a deflection drive assembly.

6. The method of claim 4 wherein scanning the illumination spot comprises driving the optical fiber substantially at its resonant frequency.

7. The method of claim 5 wherein the deflection drive assembly comprises a piezoelectric drive assembly.

8. The method of claim 1 comprising the captured position of the illumination spot with the time points in a look-up table or as an algorithm.

9. The method of claim 8 wherein the captured positions of the illumination spot are indexed sequentially in the look-up table based on its time after a beginning of a drive signal.

10. The method of claim 1 wherein scanning the illumination spot and capturing the position of the scanning illumination spot is carried out in a calibration chamber.

11. The method of claim 10 wherein the calibration chamber comprises a photosensitive position sensor, wherein capturing the position of the scanning illumination spot is carried out with the photosensitive position sensor.

12. The method of claim 1 wherein the scan pattern is a spiral scan pattern.

13. The method of claim 1 wherein the scanning beam device is a display.

14. A method of remapping an image that is obtained or generated by a scanning beam device, the method comprising:
   a) characterizing a scan pattern of a scanning beam device prior to scanning a target area with the device, the characterizing comprising:
      positioning the scanning beam device adjacent to one or more sensors of a calibration apparatus;
      enabling an illumination source to deliver light through the scanning beam device;

scanning an illumination spot in a scan pattern over the one or more sensors;

capturing a position of the scanning illumination spot at selected time points in the scan pattern; and storing the time points and the positions of the illumination spot in a memory module;

b) positioning the scanning beam device adjacent a target area and scanning the illumination spot over the target area in the scan pattern;

c) capturing backscattered light from the target area at a plurality of time points in the scan pattern; and d) constructing an image of the target area by placing the captured backscattered light in a pixel position that corresponds to the position of the illumination spot for the same time point in the scan pattern during the capturing step.

* * * * *